United States Patent [19]

Koestecki

[11] Patent Number: 4,564,491
[45] Date of Patent: Jan. 14, 1986

[54] PREPARING GLASS FLAKE REINFORCED REACTION INJECTION MOLDED POLYMERS

[75] Inventor: Raymond J. Koestecki, Sterling Heights, Mich.

[73] Assignee: General Motors Corporation, Detroit, Mich.

[21] Appl. No.: 570,905

[22] Filed: Jan. 16, 1984

Related U.S. Application Data

[63] Continuation-in-part of Ser. No. 353,562, Mar. 1, 1982, abandoned.

[51] Int. Cl.$^4$ ...................... B29C 45/16; B29K 75/00
[52] U.S. Cl. .................................... 264/108; 264/240; 264/328.6; 264/328.12; 264/328.18; 264/DIG. 77
[58] Field of Search ..................... 264/108, 240, 328.6, 264/328.18, 328.12, DIG. 77

[56] References Cited

U.S. PATENT DOCUMENTS

| | | | |
|---|---|---|---|
| 2,233,259 | 2/1941 | Harth | 49/77 |
| 2,885,268 | 5/1959 | Breer et al. | 264/328.6 |
| 3,222,439 | 12/1965 | Bolomey et al. | 264/108 |
| 3,759,852 | 9/1973 | Bradley | 106/291 |
| 3,849,527 | 11/1974 | Drostholm | 264/240 |
| 4,190,711 | 2/1980 | Zdrahala et al. | 264/328.6 |
| 4,314,962 | 2/1982 | Wollensak et al. | 264/328.6 |
| 4,444,703 | 4/1984 | Dominguez et al. | 264/328.6 |

FOREIGN PATENT DOCUMENTS

| | | | |
|---|---|---|---|
| 55-133934 | 10/1980 | Japan | 264/328.18 |
| 55-133936 | 10/1980 | Japan | 264/328.6 |
| 2035111A | 6/1980 | United Kingdom | 264/328.6 |

OTHER PUBLICATIONS

Flakeglas-Filled Coatings: Past, Present and Future, Sprecher, Owens/Corning Fiberglas Europe S.A., Brussels, Belgium, 4AC/E09.80.
Handbook of Fillers and Reinforcements for Plastics, Katz and Milewski-pp. 362-364.

Primary Examiner—Jeffery Thurlow
Attorney, Agent, or Firm—Elizabeth F. Harasek

[57] ABSTRACT

The physical properties of reaction injection molded (RIM) polymeric articles are substantially improved by internally reinforcing them with flake glass filler particles. The flake glass is incorporated in the liquid chemical polymer precursors, and is coinjected with them into the mold. The flow of the liquids in the mold orients the glass flake to provide maximum improvement in physical properties in the hardened polymerized article. Molding with glass flake filler also substantially alleviates problems of surface waviness in RIM panels.

9 Claims, No Drawings

PREPARING GLASS FLAKE REINFORCED REACTION INJECTION MOLDED POLYMERS

This application is a continuation-in-part of U.S. Ser. No. 353,562, filed March 1, 1982 now abandoned.

BACKGROUND

This invention relates to improved reinforced reaction injection molded (RIM) polymeric articles and to a method of making them. More particularly, the invention relates to the incorporation of flaked glass particles in liquid RIM precursor constituents. The constituents are molded such that the glass flakes are preferentially oriented to improve physical characteristics of the polymerized article.

Reaction injection molding (RIM) is a process by which highly chemically reactive liquids are injected into a mold where they polymerize in a few seconds to form a coherent, molded article. The most common RIM processes today involve a rapid reaction between highly catalyzed polyether or polyester polyol and isocyanate constituents. The constituents are stored in separate tanks prior to molding and are first mixed in the mixhead upstream of a mold. Once mixed, they react rapidly to gel and then harden to form polyurethane polymers. While the invention will be specifically described in terms of urethane RIM systems, it has application to reaction injection molding processes based on other very rapidly reacting chemical systems.

Although reaction injection molded urethanes have many desirable physical characteristics, they also have generally high coefficients of thermal expansion (CTE), poor dimensional stability over wide temperature ranges and considerable flexibility at room temperature. Morover, a large, filler-free RIM panel when attached to a rigid support structure may permanently buckle and wave at elevated temperatures. Thus, as molded, unreinforced RIM urethanes are not generally directly suitable for use as large automotive panels or in other semistructural or structural panel applications. Furthermore, the larger the surface area and thinner the aspect of a panel, the more serious these problems become. As a consequence, the use of reinforcing fillers in RIM urethanes has been extensively examined by this inventor and others.

Currently, some automotive body panels are made from RIM urethanes filled with short (less than ⅛") milled glass fiber, generally in amounts less than about 25% of the polymer weight. Chopped glass is not a good filler for RIM systems because it makes the liquid in which it is contained difficult to impingement mix, even at inclusion levels of only a few weight percent.

Wollastonite, a calcium metasilcate-based mineral, is sometimes used as a low cost alternative to milled fiberglass. However, its morphology is the same as that of glass fiber so it creates the same problems in molded panels. I have found that the moisture content of wood fibers is too high for use in isocyanate-containing systems. Latent water reacts to form urea and carbon dioxide which cause high porosity and poor strength in urethane RIM panels. Other isocyanate compatible fibrous fillers such as carbon fibers, asbestos, nylon, rayon, etc., produce results similar to those of milled glass. Therefore, I do not believe that any single type or combination of fibrous fillers alone will provide the increased isotropic strength, decreased CTE and cosmetic characteristics desirable for automotive body and other thin aspect structural panels.

The incorporation of solid and hollow glass spheres to improve the physical properties and appearance of RIM panels was also examined. However, incorporating glass spheres did not result in any significant improvement in strength or reduced coefficients of thermal expansion.

Attempts were also made to incorporate flakeshaped mica particles in urethane RIM panels. However, the mica flakes adversely effected the chemistry of the constituents so that all test panels had very poor adherence and inferior physical properties.

Another problem encountered in the manufacture of large urethane RIM panels is the rapid impingement mixing of the reactive isocyanate and polyol constituents. Unless gelation takes place within a few seconds after mixing and mold injection, the process cannot be used to economically produce parts weighing several pounds at high volumes. The RIM systems that have been used commercially for the last few years gel within two to six seconds. Once gelation occurs, movement of filler particles is restricted.

To get good and rapid mixing, the constituents must be fluid when they are ejected through the impingement mixing ports at high pressures (~2000 psi). Today's RIM systems are so fast that by the time the mixed liquids fill the mold, they have already gelled. Obviously, this property further limits the scope of acceptable fillers. It certainly precludes the use of paste-like constituents containing high filler loadings. Such pastes cannot be dispersed into the liquid constituents rapidly enough to assure complete mixing and uniform distribution of filler particles in a uniform molded panel.

Thus, although many different varieties of reinforcing fillers have been examined for urethane RIM, none seem to be capable of providing the desired results. The complexity of the reaction injection molding process itself and the sensitivity and criticality of the rapidly reacting constituent chemicals clearly do not easily accommodate the incorporation of reinforcing fillers in RIM products to improve CTE, isotropic strength, appearance or other important physical properties.

OBJECTS

It is therefore an object of the invention to provide a method of reaction injection molding articles with substantially improved coefficients of thermal expansion, strength, and less surface waviness than articles made heretofore by RIM processes.

It is a more particular object to improve the physical properties of RIM articles by the inclusion of glass flake fillers. A more particular object is to incorporate glass flakes in liquid RIM precursors and to inject these constituents into a mold in a manner to orient the flakes so as to optimize the physical characteristics of the finished article.

Another object is to provide a method of making a panel or panel-like RIM article where the physical properties are particularly improved in all directions in the plane of the panel. More specifically, it is an object to reinforce RIM panels with glass flakes to effect such improvement. In a panel in accordance with the invention, the glass flake is incorporated in a reinforcing amount such that the flakes are aligned with their planar surfaces substantially parallel to the planar surfaces of the panel. Such reinforced panels are stronger, have

BRIEF SUMMARY

In accordance with a preferred embodiment of the invention, these and other objects may be accomplished as follows.

A desired amount of glass flake is mixed with and dispersed in one or more of the chemically reactive liquid precursor constituents for reaction injection molding. Generally, at least about 5 weight percent based on the total polymer weight is desirable. The reinforcing effect of the glass flake increases proportionately to the amount incorporated.

Herein, glass flake is defined as small particles of friable amorphous material having a generally planar surface, the area of that surface being substantially greater than the particle thickness. The flakes are preferably no more than a few microns thick and have aspect ratios (flake surface area to thickness ratios) of at least about 40:1. The diameters of the particles must be small enough to flow through RIM metering, mixing and injecting equipment without clogging. A preferred type of flake glass is made by melting a suitable glass composition based on silica; extruding the molten material through a bushing to form glass film; cooling the film, and breaking it between cooperating rollers. The particles so produced may be further reduced in size in a suitable mill. The individual particles closely resemble minute panes of broken window glass. They may be coated with surface active agents such as silane to improve their dispersion and bonding characteristics.

All the chemically reactive liquid constituents and the glass flakes dispersed therein are thoroughly mixed prior to delivery to the mold. However, it is the shape of the mold and the flow of the liquid constituents therein that ultimately determine the orientation of the flake glass in the polymerized product. The flake orientation, in turn, determines the direction and degree of improvement in physical characteristics provided by the flake glass filler.

Generally, the glass flakes align in the mold with their longest dimensions parallel to the direction of flow of the liquid constituents in which they are carried. In molds for making articles with relatively thin cross sections, the flakes also become oriented with their planar surfaces parallel to the mold surfaces. Substantial reinforcement is provided by glass flake in all directions in the plane of the flake. Thus, in glass flake filled reaction injection molded panels, substantial improvement in physical characteristics is provided in all directions in the panel plane.

What may be even more significant for certain applications is the fact that glass flake filled RIM panels have much less wavy surfaces than their glass fiber-filled counterparts and do not develop waviness when thermally cycled. This means that articles such as automotive body panels can be molded, painted and installed without special finishing procedures needed to eliminate surface waviness in glass fiber filled panels. Moreover, glass flake filled panels can fill applications where unfilled panels cannot be used.

Clearly significant advantages are to be gained by incorporating glass flake as a filler in reaction injection molded plastics.

DETAILED DESCRIPTION

My invention will be better understood in view of this more detailed description.

A molding trial was conducted using glass flake filler in an otherwise conventional urethane reaction injection molding system. In the trial, flat plaques were molded from unfilled urethane, urethane filled with short lengths of milled glass fiber and flake glass.

The crosslinked urethane was the reaction product of a polyether polyol with a hydroxyl functionality greater than two and diisocyanate terminated prepolymer based on methylene diisocyanate. The polyol was NIAX D337 Resin made by Union Carbide and the isocyanate was ISONATE 143L made by Upjohn. The polyol and isocyanate were initially retained in separate pressurized agitated tanks with nitrogen or dry air blankets. These urethane forming chemicals have been used heretofore to make fiber glass filled structural panels.

The polyol and isocyanate were metered into the mixer by means of a Krauss Maffei PU80 metering machine. The unit was capable of processing the reinforcements only on the polyol side. Positive displacement piston pumps were used to eject the polyol and isocyanate into an impingement mixing chamber. The chamber itself had a cylindrical shape, the polyol and isocyanate ports being located at 90° intervals of a circumference of the cylinder in alternating order. The port of the filled polyol had a diameter of 4.2 mm and that for the unfilled isocyanate 2.0 mm. The injection pressures of the polyol and isocyanate were 2350 psi and 2200 psi, respectively. The polyol was maintained at a tank temperature of approximately 46.1° C. (115° F.) and the isocyanate at 33.9° C. (93° F.). The output capacity of the metering equipment to the mold cavity was approximately 3.5 pounds per second.

The molding machine used was a Kannegeisser Model MFT. A two-piece mold was mounted on the stationary and movable press platens. The mold had a plaque-shaped cavity with a flat surface area of 24"×42" and a thickness of 0.1 inch. The upper platen tilted away from the lower platen in the mold open position to facilitate demolding. The panel weighed about five pounds and injection time was less than 1.5 seconds to assure fill out of the panel mold and uniform distribution of the glass flake in the panel.

The mold cavity walls were coated with Green Chem MR 6023 paste and sprayed with Chem Trend XMR 136 mold release before each shot. The mold temperature was maintained at about 170°–185° F. For filled plaques a minimum mold temperature of about 180° F. was desirable to prevent skinning. The gate to the mold had an elongated slit shape which ran the length of the shorter side of the mold (approximately 16 inches).

Preparatory to molding unfilled urethane plaques, the polyol and isocyanate outputs of the RIM machine were calibrated to achieve a weight ratio of 100 parts polyol to 102.5 parts isocyanate. While this produced a relatively brittle urethane, it was suitable for comparing the properties of unfilled, glass fiber filled and glass flake filled plaques molded in like manner in the mold described above. All plaques were post cured in a flat position for 30 minutes at 250° F. to complete polymerization.

The calculation of a predetermined weight fraction filler in a molded urethane plaque was made as follows (iso refers to isocyanate):

$$\frac{\text{wt polyol} + \text{wt iso}}{1.00 - \text{weight fraction filler}} - (\text{wt. polyol} + \text{wt iso}) = \text{wt. filler}$$

Because the machine used to mold plaques could only accommodate filler on the polyol side, the weight percent filler to be dispersed was calculated as follows:

$$\frac{\text{wt filler}}{\text{wt polyol} + \text{wt filler}} = \text{wt fraction filler in polyol}$$

The ratio of filled polyol to isocyanate was then recalculated on the basis of 100 parts polyol and filler to allow for the filler in the polyol:

$$\frac{\text{wt polyol} + \text{wt filler}}{\text{wt iso}} = \frac{100}{X} \frac{\text{parts filler polyol}}{\text{parts unfilled iso}}$$

For example, if 15 weight percent glass fiber was to be introduced into the urethane system described above at a polyol to iso ratio of 100:102.5 then $$\frac{100 \text{ polyol} + 102.5 \text{ iso}}{1.00 - .15} - (100 \text{ polyol} + 102.5 \text{ iso}) =$$

35.7 parts glass fiber

Then to determine the amount of glass to be mixed with the polyol constituent $$\frac{35.7 \text{ glass fiber}}{100 \text{ polyol} + 35.7 \text{ glass fiber}} = 26.3 \text{ wt percent glass fiber in polyol}$$

Then to readjust the mix ratio to maintain the predetermined chemical ratio of 100 parts polyol to 102.5 parts isocyanate $$\frac{100 \text{ polyol} + 37.5 \text{ glass fiber}}{102.5 \text{ isocyanate}} =$$

$$\frac{100 \text{ parts polyol \& glass fiber}}{75.53 \text{ iso}}$$

Thus the machine was set to deliver 100 parts polyol and glass per 75.53 parts isocyanate to achieve a 15 weight percent fiber glass filler in the molded urethane article. Obviously, the calculations would be the same for glass flake, glass fiber or other solid filler.

Table I indicates the Sample Designation and number of plaques that were molded during an experimental run in accordance with the invention:

TABLE I

| SAMPLE DESIG- NATION | NUMBER MOLDED | REINFORCEMENT/LEVEL |
|---|---|---|
| N- | 10 | Unfilled |
| G-15 | 8 | OCF P117B 1/16" milled glass fibers, |
| G-25 | 8 | 15% & 25% by weight, respectively. |
| SG-15 | 10 | OCF P117B Low aspect ratio milled |
| SG-25 | 10 | glass fibers (<1/32"), 15% and 25% by weight, respectively. |
| F-10 | 10 | OCF Hammermilled "C"Flakeglas- |
| F-15 | 11 | 1/64" 10% and 15% by weight, respectively. |
| GF #1 | 10 | 5% Flakeglas/5% P117B - 1/16" |
| GF #2 | 10 | 5% Flakeglas/10% P117B - 1/16" |

TABLE I-continued

| SAMPLE DESIG- NATION | NUMBER MOLDED | REINFORCEMENT/LEVEL |
|---|---|---|
| GF #3 | 10 | 10% Flakeglas/5% P117B - 1/16" |
| GF #4 | 11 | 10% Flakeglas/10% P117B - 1/16" |

Two types of fiberglass were employed. The first was OCF P117B-1/16" milled glass fibers sold by Owens-Corning. These samples are designated with a G. The glass was coated with a dispersion enhancing resin. In an effort to improve the properties of fiberglass filled RIM plaques in directions other than the flow direction in the mold, very short glass fibers were used in some of the trials. These fibers were OCF P117B screened to include particles 1/32" in length and less. These samples are designated SG for short glass.

The key constituent of the subject invention is flaked glass. (Sample designation F). Although flaked glass has been known since the mid '50's, it has heretofore not been used as a filler constituent for RIM. Flaked glass is made by melting a glass of desired chemical composition. The molten glass is then extruded through a heated annular bushing. The extrusion forms a cone-shaped glass film, generally about 2 to 10 microns thick, which is continuously pulled away from the bushing by a pair of pinch rollers. The film cools rapidly and is broken by the rollers. The broken films are hammer-milled to create small particles of "flake" glass. The individual particles resemble broken panes of window glass. Flake glass suitable for use in the subject invention is described in greater detail in "Flakeglas ®-Filled Coatings: Past, Present and Future" by Dr. N. Sprecher, published by Owens-Corning Fiberglas European Operations. For the subject invention, I prefer E or C type glass particles which are less than about 8 microns thick, with an average diameter less than about 1/32". The preferred aspect ratio of flake surface area to thickness is greater than about 25:1 and preferably greater than 40:1. Larger glass particles may be used, however, they tend to be more abrasive and harder to handle in conventional reinforced RIM systems. The flake glass may be coated with silane or other dispersion enhancing coatings. However, the glass flake used in the molding trials reported herein were not so coated.

Some preliminary work has been done with silane coated glass flake. Qualitatively, it appears that the silane coating promotes rapid dispersion of the flake in polyol resin. It also seems to promote bonding between the RIM polymer matrix and the flake particles. This in turn, enhances the effect of the flake filler on the physical properties of the polymer matrix.

Physical property data and rheometic impact data were taken using standard ASTM test methods for each type of plaque from Table I. The results are shown in Tables 2 and 3. Samples designated A were cut from the ½ of the test plaque closest to the mold inlet runner while those designated B were taken from the half of the test plaque furthest from the inlet runner. The tests were conducted on the samples both in the direction of flow in the mold (designated parallel) and in the direction in the plane of the plaque perpendicular to the flow (designated perpendicular).

TABLE 2

PHYSICAL PROPERTY DATA*

FLEX. MODULUS.

TABLE 2-continued

| SAMPLE DESCRIPTION | ACTUAL WEIGHT PERCENT | SPECIFIC GRAVITY | PHYSICAL PROPERTY DATA* (PSI) | | COEFFICIENT OF THERMAL EXPANSION (IN/IN × $10^{-6}$/°F.) | |
|---|---|---|---|---|---|---|
| | | | ($\perp$) MEAN/ STD. DEV. | ($\parallel$) MEAN/ STD. DEV. | ($\perp$) | ($\parallel$) |
| N - (A) | .01 | 1.04 | 89,000/216 | 92,100/533 | 73.8 | 73.9 |
| N - (B) | .01 | 1.03 | 91,200/244 | 90,300/152 | 73.6 | 73.1 |
| G15 (A) | 14.3 | 1.11 | 135,000/517 | 187,000/295 | 53.3 | 34.4 |
| G15 (B) | 16.0 | 1.08 | 153,000/378 | 179,000/436 | 51.1 | 33.2 |
| G25 (A) | 22.9 | 1.19 | 150,000/327 | 299,000/404 | 52.3 | 18.0 |
| G25 (B) | 24.5 | 1.16 | 158,000/862 | 285,000/1042 | 53.9 | 14.0 |
| SG15 (A) | 15.7 | 1.30 | 175,000/349 | 179,000/251 | 46.6 | 59.9 |
| SG15 (B) | 15.0 | 1.28 | 163,000/339 | 172,000/610 | 47.7 | 47.1 |
| SG25 (A) | 24.7 | 1.33 | 187,000/192 | 208,000/492 | 53.0 | 50.1 |
| SG25 (B) | 24.3 | 1.27 | 179,000/358 | 213,000/283 | 59.6 | 46.1 |
| F-10 (A) | 8.7 | 1.17 | 155,000/329 | 169,000/527 | 50.7 | 48.6 |
| F-10 (B) | 9.3 | 1.12 | 172,000/422 | 183,000/241 | 50.3 | 47.0 |
| F-15 (A) | 13.5 | 1.16 | 171,000/409 | 196,000/303 | 46.0 | 37.5 |
| F-15 (B) | 15.8 | 1.14 | 184,000/451 | 208,000/548 | 44.7 | 37.1 |
| GF #1 (A) | 10.0 | 1.23 | 178,000/295 | 216,000/515 | 58.4 | 38.4 |
| GF #1 (B) | 11.9 | 1.20 | 183,000/404 | 232,000/524 | 51.3 | 36.8 |
| GF #2 (A) | 15.2 | 1.24 | 189,000/415 | 251,000/714 | 52.8 | 31.3 |
| GF #2 (B) | 16.2 | 1.23 | 198,000/593 | 278,000/620 | 54.0 | 28.1 |
| GF #3 (A) | 13.6 | 1.13 | 158,000/279 | 191,000/577 | 50.7 | 34.5 |
| GF #3 (B) | 14.3 | 1.07 | 163,000/195 | 212,000/546 | 47.2 | 30.7 |
| GF #4 (A) | 18.7 | 1.16 | 166,000/630 | 227,000/288 | 44.9 | 27.5 |
| GF #4 (B) | 20.1 | 1.10 | 165,000/614 | 201,000/695 | 39.2 | 26.3 |

| SAMPLE DESCRIPTION | HEAT SAG (INCHES) (1 HOUR @ 250° F.) ($\perp$)/($\parallel$) | TENSILE STRENGTH (PSI) | | % ELONGATION | | PERCENT PART SHRINKAGE ($\perp$)/($\parallel$) |
|---|---|---|---|---|---|---|
| | | ($\perp$) MEAN/ STD. DEV. | ($\parallel$) MEAN/ STD. DEV. | ($\perp$) MEAN/ STD. DEV. | ($\parallel$) MEAN/ STD. DEV. | |
| N - (A) | .74/.60 | 4090/70.9 | 4140/143.8 | 95.8/11.8 | 112/15.4 | 1.45/1.51 |
| N - (B) | .79/.64 | 3930/156.6 | 3900/96.2 | 92.6/20.7 | 88.8/12.5 | |
| G15 (A) | .65/.28 | 4220/91.5 | 4290/126.2 | 35.4/10.2 | 23.2/6.3 | .92/.60 |
| G15 (B) | .65/.25 | 4030/143.6 | 4200/65.4 | 27/8.4 | 21.4/2.4 | |
| G25 (A) | .88/.20 | 4580/129.9 | 4940/275.4 | 38.8/1.9 | 19/5.7 | .90/.28 |
| G25 (B) | .91/.23 | 4240/64.4 | 5100/57.2 | 39/7.6 | 14.4/3.3 | |
| SG15 (A) | 2.29/2.03 | 5050/102.1 | 4890/44.4 | 39.6/6.2 | 40.2/4.2 | .90/.91 |
| SG15 (B) | 2.18/1.82 | 4880/23.9 | 4760/140.3 | 30.8/6.4 | 31.2/3.0 | |
| SG25 (A) | 1.08/.76 | 5220/342.6 | 5250/406.0 | 26.8/7.3 | 28.4/6.4 | .92/.83 |
| SG25 (B) | .86/.52 | 4810/133.9 | 4970/19.5 | 29.4/5.0 | 30/6.0 | |
| F-10 (A) | .52/.30 | 3370/18.7 | 3570/63.1 | 19.4/3.1 | 28/5.8 | .95/.96 |
| F-10 (B) | .61/.38 | 4390/97.8 | 4410/87.6 | 25.6/5.1 | 27.4/1.5 | |
| F-15 (A) | 1.10/.87 | 3870/39.0 | 3900/56.3 | 14.8/2.2 | 16.6/1.5 | .90/.78 |
| F-15 (B) | .72/.62 | 3790/57.9 | 3880/25.9 | 20.6/6.0 | 15.6/3.6 | |
| GF #1 (A) | 1.66/1.10 | 4500/78.0 | 4670/52.4 | 20/3.4 | 20.6/5.0 | .95/.78 |
| GF #1 (B) | 1.44/.91 | 4260/57.7 | 4500/170.9 | 20.2/3.8 | 16.2/4.1 | |
| GF #2 (A) | 1.65/.75 | 4740/287.0 | 4870/60.2 | 26.4/6.5 | 19.6/3.1 | .90/.51 |
| GF #2 (B) | 1.37/.72 | 4540/102.3 | 4900/94.8 | 21.4/5.7 | 15.6/4.3 | |
| GF #3 (A) | .63/.38 | 4040/38.3 | 4160/46.6 | 23.4/5.4 | 24/4.4 | .90/.67 |
| GF #3 (B) | .70/.51 | 3660/33.9 | 3900/41.6 | 26.2/2.6 | 22/3.7 | |
| GF #4 (A) | 1.03/.55 | 4140/63.1 | 4440/17.9 | 19.6/6.4 | 19.4/0.9 | .77/.50 |
| GF #4 (B) | .99/.45 | 3740/32.7 | 3810/242.7 | 18.8/4.7 | 16.6/3.3 | |

*Tests at room temperature (~23° C.) unless otherwise indicated.

TABLE 3

RHEOMETRIC IMPACT TEST DATA

| Sample Description | Thickness (MM) | Speed (M/S) | YIELD | | | TOTAL | |
|---|---|---|---|---|---|---|---|
| | | | Force (N) | Travel (MM) | Energy (J) | Travel (MM) | Energy (J) |
| N- | 2.46 | 2.230 | 2542 | 12.07 | 13.95 | 13.19 | 15.37 |
| G-15 | 2.63 | 2.230 | 888 | 3.97 | 1.52 | 18.16 | 8.11 |
| G-25 | 2.61 | 2.230 | 825 | 4.42 | 1.74 | 19.73 | 11.12 |
| SG-15 | 2.44 | 2.230 | 1533 | 6.17 | 4.09 | 17.90 | 11.39 |
| SG-25 | 2.44 | 2.230 | 1224 | 5.72 | 2.92 | 19.62 | 9.99 |
| F10 | 2.69 | 2.230 | 1328 | 6.59 | 3.61 | 17.75 | 10.33 |
| F15 | 2.59 | 2.230 | 752 | 3.44 | 1.11 | 18.90 | 7.44 |
| GF #1 | 2.34 | 2.230 | 952 | 4.71 | 1.83 | 16.86 | 8.80 |
| GF #2 | 2.43 | 2.230 | 797 | 3.33 | 1.20 | 19.22 | 8.93 |
| GF #3 | 2.70 | 2.230 | 828 | 3.72 | 1.36 | 18.29 | 8.70 |
| GF #4 | 2.81 | 2.230 | 868 | 4.30 | 1.85 | 18.56 | 9.70 |

Each Value is the average of five (5) samples tested at room temperature (~23° C.)

M/S = Meters/Second
N = Newtons

J=Joules
MM=Millimeters

The unfilled plaques as molded had relatively low flex moduli and high coefficients of thermal expansion (CTE). They also had poor heat sag characteristics, tensile strengths, high elongations and relatively large shrinkage due to cure.

In the parts molded with 1/16" glass, the glass fibers tended to orient substantially parallel to the flow of material into the mold. Thus, the plaques showed improved flex moduli, tensile strength, and part shrinkage only in the parallel direction. However, these properties were not improved to any appreciable extent in the direction perpendicular to mold flow. They exhibited the characteristic waviness of glass fiber filled RIM panels.

Parts molded from the short glass showed no appreciable improvement in some physical properties, particularly CTE and strength.

TABLE 4

|  |  | PERPENDICULAR | | | PARALLEL | | |
|---|---|---|---|---|---|---|---|
|  |  | U | G-15 w/o | F-15 w/o | U | G-15 w/o | F-15 w/o |
| Flex Modulus PSI × 1000 | A* | 89 | 135 | 171 | 92 | 187 | 196 |
|  | B | 91 | 153 | 184 | 90 | 179 | 208 |
| CTE (in/in × $10^{-6}$/°F.) | A | 73.8 | 53.3 | 46.0 | 73.9 | 34.4 | 37.5 |
|  | B | 73.6 | 51.1 | 44.7 | 73.6 | 33.2 | 37.1 |
| Heat Sag (1 Hr @ 250° F.) | A | 0.74 | 0.65 | 1.10 | 0.60 | 0.28 | 0.87 |
|  | B | 0.79 | 0.65 | 0.72 | 0.64 | 0.25 | 0.62 |
| Tensile Strength | A | 4090 | 4220 | 3870 | 4140 | 4290 | 3900 |
|  | B | 3930 | 4030 | 3790 | 3900 | 4200 | 3880 |
| Percent Elongation | A | 95.8 | 35.4 | 14.8 | 112 | 23.2 | 16.6 |
|  | B | 92.6 | 27 | 20.6 | 88.8 | 21.4 | 15.6 |
| Percent Part Shrink | A | 1.45 | .92 | .90 | 1.51 | .60 | .78 |

*A indicated sample cut from half of plaque adjacent mold inlet runner.
B indicates sample cut from half of plaque remote from mold inlet runner.

Table 4 sets out data taken from Table 2 for unfilled, 15% glass fiber filled (G-15%), and 15% flake glass filled (F-15%) panels for purposes of comparing their physical properties parallel and perpendicular to polymer flow in the mold. The data show improvements in modulus, reduced coefficients of thermal expansion and lowered elongation for both glass fiber and flake filled panels, especially in the parallel direction. However, only the glass flake filled sample exhibited substantial improvement of these properties in the perpendicular direction. Thus, flake glass has been shown to be superior over all to glass fiber fillers and to substantially improve the physical properties of molded RIM panels in all directions in the plane of the panel.

Examination of plaques molded from flake glass filled urethane showed that the glass flakes orient with their planar surfaces substantially parallel to the plane of the plaques. This arrangement of filler plates provides for improved properties in all directions in the plane of a panel-like part. Although other platey fillers have been tried, glass flakes have thus far been found to be the only suitable fillers for making RIM panels with surfaces good enough for enameled automotive body panels.

Automotive door and quarter panels for the Pontiac Motor Company Fiero model have been made from urethane filled with 20 to 23 weight percent glass flake (30-35 weight percent in polyol, isocyanate unfilled). The urethane system is Mobay Bayflex 110-80 which is further catalyzed with small amounts of tin and amine urethane catalysts. The door panel requires a seven pound shot, and has a finished weight of about six pounds.

The fill time for the door panel is 1.1 seconds. At injection times of 1.5 seconds all parts are scrap. Moreover, the injection pressure of both constituents must be greater than 2000 psi or there is poor mixing which results in delamination and a bad surface finish.

The flow of glass flake in the mold is restricted as soon as the isocyanate and polyol constituents gel. Gelation time for the catalyzed Bayflex system is less than two seconds. Because of this short gel time, the viscosity of the impingement mixed constituents must be closely controlled. If the viscosity of the filled polyol becomes too high poor mixing results which in turn results in bad parts.

Prior usage of glass flake filler has been restricted to slow curing epoxy systems where the liquids containing the flake can be spread and worked to accomplish flake orientation. The RIM systems of this invention do not allow such latitude. For example, the glass flake cannot be dispersed in a viscous paste injected at low pressure downstream from the impingement mixing head. Even at a distance of only a few milimeters from the mixing ports, the amine catalyzed constituents have already begun to react and gel. In such state, they could not effectively disperse a glass flake containing paste, much less fill out the mold and orient the flake particles therein. Given the many difficulties of working with highly catalyzed RIM systems, the successful incorporation of relatively high loadings of glass flake represents an inventive and unexpected advance in the art.

Another remarkable and unexpected improvement brought about by the use of flake glass filler is the complete elimination of visually unappealing surface waviness. This improvement is particularly noticeable in panels coated with glossy paint. Distinctness of image refers to the ability of a smooth, glossy surface to reflect an image without added distortion from irregularities in the coating or substrate. The glass flake filled panels (as molded) all had distinctness of image properties at least as good as glass fiber filled panels presanded to remove surface waviness. Furthermore, the glass flake filler eliminated any tendency for the RIM plaques to warp, even when thermally cycled. Even without the improved physical properties pointed out above, the unexpected but great improvement in surface waviness and warpage brought about by flake glass filler could warrant its use in RIM systems.

While my invention has been described in terms of the specific embodiment thereof, clearly other forms may be readily adapted by one skilled in the art. Accordingly, my invention is to be limited only by the following claims.

The embodiments of the invention in which an exclusive property or privilege is claimed are defined as follows:

1. A method of molding a reinforced polymeric panel by injecting a hardenable liquid polymer precursor carrying high aspect ratio glass flake particles into a mold cavity defining said panel, the initial injection pressure of said glass flake carrying liquid being at least about 2000 pounds per square inch, causing said liquid to flow away from the point of injection such that said glass flakes are layered with their planar surfaces substantially parallel to the planar surfaces of the panel as the mold is filled, and immediately gelling said liquid precursor in the mold such that the glass flakes are captivated in the hardened polymeric panel in said layered positions, the amount of said glass flake dispersed in said precursor being such that the hardened panel has a reduced coefficient of thermal expansion in all directions in the plane of the panel compared to a like unfilled panel and a substantially less wavy surface than a like glass fiber filled panel both having been molded from the liquid polymer precursor in like manner.

2. A method of molding an internally reinforced polyurethane panel comprising dispersing a reinforcing amount of high aspect ratio glass flake into one or both of the liquid polyol and isocyanate precursor constituents for said urethane polymer, rapidly mixing said polyol and isocyanate precursors at a pressure of at least 2000 psi to form a chemically reactive urethane-forming liquid mixture, immediately injecting said liquid mixture into a mold for a said panel under pressure such that the mixture flows away from the injection port and causes the glass flake particles dispersed therein to be layered within the mold with their planar surfaces substantially parallel to the planar surfaces of the panel before gelation of the constituents, allowing said polyol isocyanate mixture to chemically react in the mold such that a hardened polymeric urethane panel is formed wherein said glass flakes are incorporated in their layered and surface parallel orientations, whereby the hardened urethane panel has a substantially wave free surface as molded and a substantially reduced coefficient of thermal expansion in all directions in the plane of the panel as compared to a like unfilled panel molded of like urethane constituents in like manner.

3. The method of claim 2 wherein the liquid polyol precursor is a polyether polyol having a functionality greater than two.

4. The method of claim 2 wherein the liquid polyol precursor is a polyether polyol having a functionality greater than two and the isocyanate precursor constituent has an isocyanate functionality of about two.

5. The method of claim 2 wherein the reinforcing amount of high aspect ratio glass flake is in the range of from about 5 to 50 weight percent of the sum of the weights of the liquid polyol and isocyanate precursor constituents.

6. The method of claim 2 wherein the mold is filled within 2 seconds of impingement mixing.

7. The method of claim 2 wherein the reinforced polyurethane panel is an automotive body panel.

8. The method of claim 2 wherein the glass flake is precoated with surface active dispersion aid.

9. A method of molding an internally reinforced polyurethane panel comprising dispersing up to about 40 weight percent glass flake particles into one or both of the liquid polyol and isocyanate precursor constituents, impingement mixing said polyol and isocyanate constituents at a pressure of at least about 2000 pounds per square inch and filling a mold for said panel with said mixed constituents and causing them to gel to captivate said glass flake particles in layered and surface parallel orientations with respect to the plane of the panel within about two seconds from the time the constituents are first impingement mixed.

* * * * *